United States Patent Office 3,277,215
Patented Oct. 4, 1966

3,277,215
THIOL-PHOSPHORIC (-PHOSPHONIC, -PHOSPHINIC) OR THIONOTHIOL-PHOSPHORIC (-PHOSPHONIC, -PHOSPHINIC) ACID ESTERS
Gerhard Schrader, Wuppertal-Cronenberg, and Walter Lorenz, Wuppertal-Vohwinkel, Germany, assignors to Farbenfabriken Bayer Aktiengesellschaft, Leverkusen, Germany, a German corporation
No Drawing. Filed May 11, 1964, Ser. No. 366,649
Claims priority, application Germany, May 21, 1963,
F 39,800
10 Claims. (Cl. 260—948)

The present invention relates to and has as its object new and useful, pesticidally, especially insecticidally active phosphorus containing compounds.

More specifically the object of the present invention are thiol- or thionothiol-phosphoric (-phosphonic, -phosphinic) acid esters of the general formula

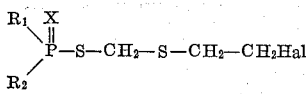

as well as a process for the production of such compounds.

In the above formula $R_1$ and $R_2$ stand for lower alkyl or alkoxy radicals, $R_1$ moreover also means an optionally halogen- and/or lower alkyl-substituted aryl, preferably phenyl radical, whilst X represents an oxygen or sulfur atom and Hal is a halogen, preferably chlorine or bromine atom.

Compounds of the constitution given above have not yet been described in the literature. In fact they could not be produced hitherto, since the β-haloethylmercaptans required as starting materials for the known processes (for example β-chloroethylmercaptan) are extremely hard to prepare, and at least when working on an industrial scale, very difficult to handle.

In accordance with the present invention it has now been found that the new class of compounds can be obtained, also on a technical scale, in an exceedingly simple manner and with excellent yields by treating β-haloethyl-thiomethyl ethers with halogenating agents, for example sulfuryl chloride or elementary chlorine, and reacting the β-haloethyl-thiohalomethyl ethers (β-haloethyl-mercaptomethyl halides) formed as intermediate products, with salts, preferably the alkali metal or ammonium salts, of thiol- or thionothiol-phosphoric (-phosphonic, -phosphinic) acids of the general formula

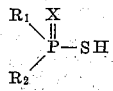

wherein the symbols $R_1$, $R_2$ and X have the same meaning as indicated above.

The reaction according to the invention may be illustrated in detail by the following scheme of formulae:

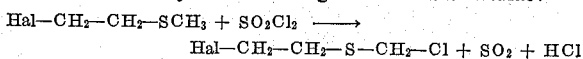

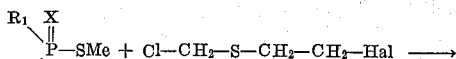

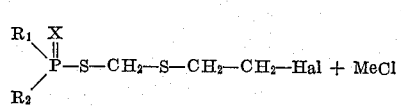

In the last mentioned formulae, $R_1$, $R_2$, X and Hal have the meaning given above, whilst Me stands for a monovalent metal equivalent, preferably an alkali metal atom or the ammonium group.

The halogenation of the β-haloethyl-thiomethyl ethers proceeds already in the cold with sufficient speed, so that the first step of the inventive process is preferably carried out at lower temperatures (−20 to +10° C.).

In the β-haloethyl-thiohalomethyl ethers obtained as intermediate products, the α-positioned halogen atom is considerably more reactive than that in β-position. The mentioned compounds therefore react smoothly and without side-reaction already at room temperature according to the above equation, exchanging the α-halogen atom for the radicals of the above-mentioned thiol- or thionothiol-phosphoric (-phosphonic, -phosphinic) acids.

In carrying out the inventive process it is not necessary to isolate the intermediate products formed in the first step; the reaction mixture obtained by halogenation of the β-haloethyl-thiomethyl ethers can immediately be reacted with the corresponding salts of thiol- or thionothiol-phosphoric (-phosphonic, -phosphinic) acids.

The reaction according to the present process is preferably carried out in the presence of inert organic solvents. For this purpose, halogenated aliphatic hydrocarbons, such as methylene chloride, chloroform or carbon tetrachloride, as well as low-boiling nitriles, for example aceto- and propionitrile, have proved to be particularly suitable.

The thiol- or thionothiol-phosphoric (-phosphonic, -phosphinic) acid esters obtainable according to the present invention are mostly colourless so slightly yellow-coloured water-insoluble oils which can be distilled without decomposition under considerably reduce pressure.

The inventive products are distinguished by outstanding pesticidal, especially insecticidal properties. They are therefore employed as pest control agents, particularly in plant protection.

The new compounds of the present invention very effectively kill insects like aphids, bugs, spider mites, mosquitos, caterpillars, cockroaches, flies, beetles, ticks, termites etc. They distinguish themselves especially by a good contact-insecticidal activity and mostly also by a strong systemic and ovicidal action. At the same time they have an activity on eating insects such as caterpillars. Most surprisingly they are of remarkably low toxicity against mammals. They may be used in the same manner as other known phosphoric insecticides, i.e. in a concentration from about 0.00001% to about 1%, diluted or extended with suitable solid or liquid carriers or diluents. Examples for such solid carriers are talc, chalk, bentonite, clay and the like, as liquid carriers there may be mentioned water (if necessary with commercial emulsifiers), alcohols, especially low alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility the inventive compounds of the following formulae (I)

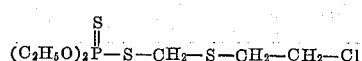

(II)

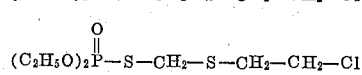

have been tested against spider mites, flies (compound I), caterpillars (compound II) and aphids.

Aqueous dilutions of these compounds have been prepared by mixing the active ingredients with the same amounts of dimethyl formamide as an auxiliary solvent adding thereto 20% by weight referred to active ingredient of a commercial emulsifier consisting of a benzyl hydroxy polyglycol ether containing about 10 to 15 glycol ethers, and diluting this premixture at last with water to the desired concentration indicated in the following paragraphs.

The tests have been carried out as follows:

(a) Against spider mites: Bean plants (*Phaseolus vulgaris*) of about 15 inches height are sprayed drip wet with solutions as prepared above and in a concentration as shown below. The bean plants have been infested heavily with the two-spotted spider (species *Tetranychus telarius*). Evaluation has been carried out after 24 hours, 48 hours and 8 days. The following results have been obtained:

| Compound | Aqueous concentration (in percent active ingredient/water) | Killing rate (in percent) |
|---|---|---|
| (I) | 0.004 | 80 |
| (II) | 0.01 | 100 |

(b) Against flies: About 50 flies (*Musca domestica*) are placed under covered petri dishes in which drip wet filter papers have been placed which are sprayed with insecticidal solutions of concentrations as shown below. The living status of the flies has been determined after 24 hours. The following results have been obtained:

| Compound | Aqueous concentration (in percent active ingredient/water) | Killing rate (in percent) |
|---|---|---|
| (I) | 0.0008 | 60 |
|  | 0.001 | 100 |

(c) Against caterpillars of the type diamond black moth (*Plutella maculipennis*): White cabbage has been sprayed drip wet with aqueous emulsions as prepared above in a concentration as shown below. Caterpillars (10 each) have been placed on the sprayed leaves of the white cabbage. The living status has been determined after 24 and 48 hours. The following results have been obtained:

| Compound | Aqueous concentration (in percent active ingredient/water) | Killing rate (in percent) |
|---|---|---|
| (II) | 0.01 | 100 |

(d) Against aphids (systemic action) of the type *Myzodes persicae*: Heavily infested savoy plants (*Brassica oleracea*) have been planted in pots of about 5 inches diameter and are watered with aqueous emulsions as prepared above in a concentration as shown below. The aqueous emulsions are taken up by the infested savoy plants. Evaluation occurred after 24 hours. The following results have been obtained:

| Compound | Aqueous concentration (in percent active ingredient/water) | Killing rate (in percent) |
|---|---|---|
| (I) | 0.1 | 100 |
| (II) | 0.1 | 100 |

The following examples are given for the purpose of illustrating the invention.

*Example 1*

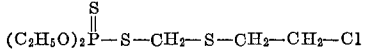

$(C_2H_5O)_2\overset{S}{\overset{\|}{P}}-S-CH_2-S-CH_2-CH_2-Cl$ 56 g. (0.5 mol) of β-chloroethyl-thiomethyl ether (B.P. 44° C./23 mm. Hg) are dissolved in 400 cc. of methylene chloride. 68 g. of sulfuryl chloride are added dropwise to this solution at —10° C. in the course of half an hour whilst stirring. The methylene chloride is then removed under reduced pressure and the residue added dropwise with stirring to a solution of 112 g. of the potassium salt of O,O-diethylthionothiol-phosphoric acid in 300 cc. of acetonitrile. The reaction mixture is stirred for 2 hours at 20 to 30° C. and then poured into 1 litre of ice-water. The separated oil is taken up in 500 cc. of benzene, the benzene solution is separated, deacidified with a 3% sodium bicarbonate solution and finally dried over sodium sulfate. By following fractional distillation, after the solvent has been evaporated, 117 g. (79% of the theoretical yield) of O,O-diethyl-thionothiol - phosphoric acid-S-(β-chloroethylmercapto-methyl) ester are obtained in the form of a slightly yellow water-insoluble oil of B.P. 105° C./0.01mm. Hg.

The mean toxicity of the compound on rats per os amounts to 50 mg./kg. of animal weight.

Spider mites are killed to 80% by 0.004% solutions, flies still to 60% by 0.0008% solutions of the product. The systemic action of 0.1% solutions of the compound against aphids amounts to 100%.

In the same manner there can be obtained the following compounds:

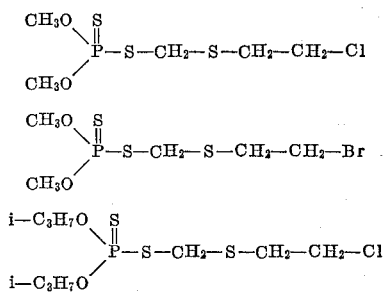

*Example 2*

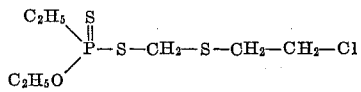

56 g. (0.5 mol) of β-chloroethyl-thiomethyl ether are dissolved in 400 cc. of methylene chloride, 68 g. of sulfuryl chloride are added dropwise to this solution at —10° C. with stirring, the mixture is subsequently stirred for one hour at —10° C. and then the solvent is removed under reduced pressure. The residue is added dropwise, whilst stirring to a solution of 105 g. of the potassium salt of ethyl-O-ethyl-thionothiol-phosphonic acid in 300 cc. of acetonitrile. The reaction mixture is then further stirred for one hour at 20 to 30° C. and worked up as described in the preceding example. 97 g. (70% of the theoretical yield) of ethyl-thionothiol-phosphonic acid-O-ethyl-S-(β-chloroethylmercapto-methyl)ester of B.P. 102° C./0.01 mm. Hg are obtained.

Spider mites are killed to 90% by 0.001% solutions of the compound. The systemic action of 0.1% solutions against aphids amounts to 100%.

By the same method there can be produced the following compounds:

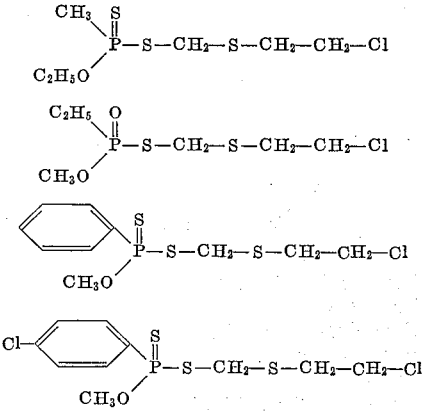

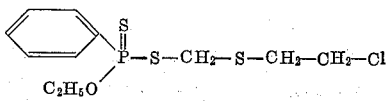

Example 3

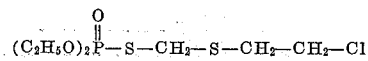

68 g. of sulfuryl chloride are added dropwise at —10° C. with stirring to a solution of 56 g. (0.5 mol) of β-chloroethyl-thiomethyl ether in 400 cc. of methylene chloride. After the addition has been completed, stirring is continued for one hour and the solvent is then removed under reduced pressure. The residue is added dropwise at room temperature, with stirring to a solution of 94 g. of the ammonium salt of O,O-diethyl-thiol-phosphoric acid in 300 cc. of acetonitrile. The reaction mixture is subsequently stirred for one hour at 30° C. and then worked up as described in Example 1. 107 g. (77% of the theoretical yield) of O,O-diethyl-thiol-phosphoric acid-S-(β-chloroethylmercapto-methyl) ester of B.P. 108° C./0.01 Hg are obtained.

The mean toxicity of the compound on rats per os amounts to 10 mg./kg. of animal weight.

Spider mites and caterpillars are completely destroyed by 0.01% solutions of the preparation. The systemic action of 0.1% solutions applied against aphids is 100%.

In the same manner there can be obtained the following compounds:

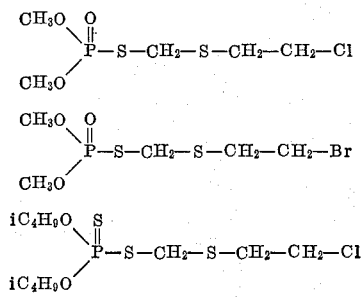

Example 4

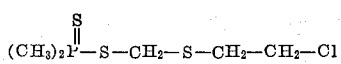

56 g. (0.5 mol) of β-chloroethyl-thiomethyl ether are dissolved in 400 cc. of methylene chloride. 68 g. of sulfuryl chloride are added to this solution at —10° C., whilst stirring, and the mixture is subsequently stirred for another half hour. The solvent is then evaporated at a low temperature and the residue is added dropwise at 20 to 30° C. with further stirring to a solution of 82 g. of the potassium salt of dimethyl-thionothiol-phosphinic acid in 300 cc. of acetonitrile. The reaction mixture is finally stirred for a further hour and then worked up as described in Example 1. 96 g. (82% of the theoretical yield) of dimethyl-thionothiol-phosphinic acid-S-(β-chloroethylmercapto-methyl) ester are obtained in the form of a colourless water-insoluble oil.

Aphids (contact-insecticidal activity) are killed to 40% by 0.01% solutions of the ester. The systemic action of 0.1% solutions against aphids amounts to 100%.

In the same manner there can be obtained the following compounds:

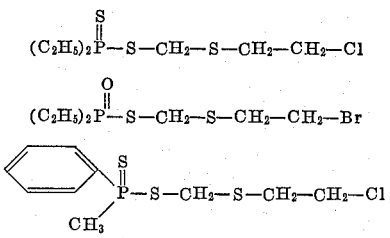

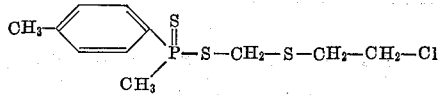

We claim:
1. A compound of the formula

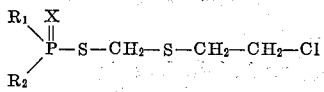

in which $R_1$ stands for a member selected from the group consisting of lower alkyl having up to 4 carbon atoms, lower alkoxy having up to 4 carbon atoms, phenyl, halogen-substituted phenyl and lower alkyl-substituted phenyl, lower alkyl having up to 4 carbon atoms and in whch $R_2$ stands for a member selected from the group consisting of lower alkyl having up to 4 carbon atoms and lower alkoxy having up to 4 carbon atoms and in which X stands for a member selected from the group consisting of oxygen and sulfur and Hal stands for a member selected from the group consisting of chlorine and bromine.

2. A compound of the formula

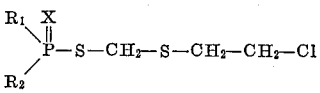

in which $R_1$ and $R_2$ stand for members selected from the group consisting of lower alkyl having up to 4 carbon atoms and lower alkoxy having up to 4 carbon atoms and in which X stands for a member selected from the group consisting of oxygen and sulfur.

3. A compound of the formula

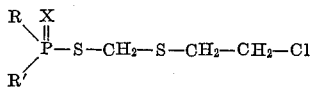

in which R and R' stand for members selected from the group consisting of methyl, ethyl, methoxy and ethoxy and in which X stands for a member selected from the group consisting of oxygen and sulfur.

4. A compound of the formula

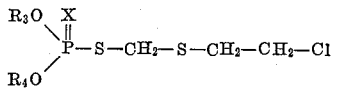

in which $R_3$ and $R_4$ stand for members selected from the group consisting of methyl and ethyl and in which X stands for a member selected from the group consisting of oxygen and sulfur.

5. A compound of the formula

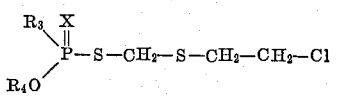

in which $R_3$ and $R_4$ stand for members selected from the group consisting of methyl and ethyl and in which X stands for a member selected from the group consisting of oxygen and sulfur.

6. A compound of the formula

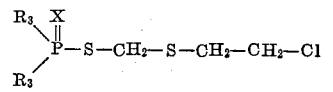

in which $R_3$ and $R_4$ stand for members selected from the group consisting of methyl and ethyl and in which X stands for a member selected from the group consisting of oxygen and sulfur.

7. The compound of the formula
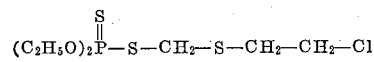
8. The compound of the formula
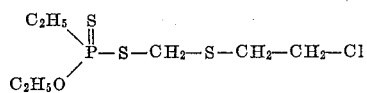
9. The compound of the formula
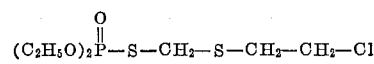
10. The compound of the formula
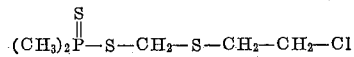
References Cited by the Examiner
UNITED STATES PATENTS
| | | | |
|---|---|---|---|
| 2,968,591 | 1/1961 | Tracy | 167—22 |
| 3,017,422 | 1/1962 | Thompson | 260—461 |
| 3,079,417 | 2/1963 | Farrar | 260—461 |
| 3,080,274 | 3/1963 | Legator et al. | 167—22 |
CHARLES B. PARKER, *Primary Examiner.*
RICHARD L. RAYMOND, *Assistant Examiner.*